United States Patent
Ko et al.

(10) Patent No.: US 7,528,371 B2
(45) Date of Patent: May 5, 2009

(54) SEMICONDUCTOR PROBE HAVING RESISTIVE TIP WITH LOW ASPECT RATIO AND METHOD OF FABRICATING THE SAME

(75) Inventors: Hyoung-soo Ko, Seoul (KR); Ju-hwan Jung, Seoul (KR); Seung-bum Hong, Seongnam-si (KR); Hong-sik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 11/448,723

(22) Filed: Jun. 8, 2006

(65) Prior Publication Data

US 2007/0040116 A1    Feb. 22, 2007

(30) Foreign Application Priority Data

Aug. 16, 2005    (KR) .................. 10-2005-0074849

(51) Int. Cl.
    *G01N 23/00* (2006.01)
(52) U.S. Cl. .................. 250/306; 250/307; 977/861
(58) Field of Classification Search ...... 250/306–443.1; 374/6, 137, 179
    See application file for complete search history.

(56) References Cited

U.S. PATENT DOCUMENTS

| 5,396,066 | A | * | 3/1995 | Ikeda et al. ............. 250/306 |
| 5,923,033 | A | * | 7/1999 | Takayama et al. ......... 250/234 |
| 5,969,238 | A | * | 10/1999 | Fischer .................... 73/105 |
| 6,123,819 | A | * | 9/2000 | Peeters .................... 204/452 |
| 6,325,904 | B1 | * | 12/2001 | Peeters .................... 257/414 |
| 6,852,968 | B1 | * | 2/2005 | Ouchi et al. ............. 250/234 |
| 7,074,340 | B2 | * | 7/2006 | Lugstein et al. .......... 216/11 |
| 2005/0208304 | A1 | * | 9/2005 | Collier et al. ............ 428/403 |
| 2008/0017845 | A1 | * | 1/2008 | Drndic et al. ............ 257/24 |

FOREIGN PATENT DOCUMENTS

| KR | 2003-0087372 A | 11/2003 |
| WO | 03/096409 A1 | 11/2003 |
| WO | WO 03/096409 A1 | 11/2003 |

* cited by examiner

Primary Examiner—Jack I Berman
Assistant Examiner—Andrew Smyth
(74) Attorney, Agent, or Firm—Sughrue Mion, PLLC

(57) ABSTRACT

A semiconductor probe having a resistive tip with a low aspect ratio and a method of fabricating the semiconductor probe are provided. The semiconductor probe includes a resistive tip and a cantilever having an end portion on which the resistive tip is located. The resistive tip doped with a first impurity includes a resistive region formed at a peak of the resistive tip and lightly doped with a second impurity opposite in polarity to the first impurity, and first and second semiconductor electrode regions formed on inclined surfaces of the resistive tip and heavily doped with the second impurity. The height of the resistive tip is less than the radius of the resistive tip. Accordingly, the spatial resolution of the semiconductor probe is improved.

18 Claims, 8 Drawing Sheets

SEMICONDUCTOR PROBE HAVING RESISTIVE TIP WITH LOW ASPECT RATIO AND METHOD OF FABRICATING THE SAME

CROSS-REFERENCE TO RELATED PATENT APPLICATION

This application claims priority from Korean Patent Application No. 10-2005-0074849, filed on Aug. 16, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a semiconductor probe having a resistive tip with a low aspect ratio and a method of fabricating the same, and more particularly, to a semiconductor probe having a resistive tip with a low aspect ratio due to a lower height than radius thereof, and a method of fabricating the semiconductor probe.

2. Description of the Related Art

As compact products such as mobile communication terminals and electronic pocket notes become more popular, the demand for micro integrated nonvolatile recording media increases. It is not easy to miniaturize existing hard disks or to provide highly integrated flash memories. Therefore, information storage devices using scanning probe microscopy (SPM) have been studied as an alternative.

Probes are used in various SPM devices. For example, probes are used for a scanning tunneling microscope (STM) that detects current produced when a voltage is applied between a probe and a sample to reproduce information, an atomic force microscope (AFM) that uses an atomic force between a probe and a sample, a magnetic force microscope (MFM) that uses an interactive force between a magnetic field produced by a sample and a magnetized probe, a scanning near-field optical microscope (SNOM) that overcomes a resolution limitation due to the wavelength of visible light, and an electrostatic force microscope (EFM) that uses an electrostatic force between a sample and a probe.

In order to record and reproduce information at high speed and high density using the techniques of such SPM, a surface charge in a small area with a diameter of several tens of nanometers should be detected. Also, cantilevers should be arranged in an array to increase recording and reproduction speeds.

FIG. 1 is a cross-sectional view of a cantilever 70 on which a resistive tip 50 is formed disclosed in International Patent Publication No. WO 03/096409. The resistive tip 50 is vertically formed on the cantilever 70 and has a resistive region 56 with a diameter of several tens of nanometers. A plurality of the resistive tips 50 can be arranged in an array form.

Referring to FIG. 1, the resistive tip 50 of the semiconductor probe includes a body 58 doped with a first impurity, the resistive region 56 disposed at a peak of the resistive tip 50 and lightly doped with a second impurity, and first and second semiconductor electrode regions 52 and 54 formed on inclined surfaces of the resistive tip 50 and heavily doped with the second impurity. The resistive region 56 is disposed between ends of the first and second semiconductor electrode regions 52 and 54.

However, the conventional semiconductor probe with the resistive tip 50 has a disadvantage in that the first and second semiconductor electrode regions 52 and 54 formed on the inclined surfaces of the resistive tip 50 are excessively wet-etched during a process of forming the resistive tip 50, thereby reducing the areas of the heavily doped inclined surfaces. Conductive areas on the inclined surfaces are accordingly reduced, thereby degrading the spatial resolution of the resistive region 56.

SUMMARY OF THE INVENTION

The present invention provides a semiconductor probe with a resistive tip which has a high spatial resolution and a low aspect ratio.

The present invention also provides a method of fabricating a semiconductor probe with a resistive tip which has a superior spatial resolution and a low aspect ratio through dry etching.

According to an aspect of the present invention, there is provided a semiconductor probe comprising: a resistive tip that is doped with a first impurity and comprises: a resistive region formed at a peak of the resistive tip and lightly doped with a second impurity opposite in polarity to the first impurity; and first and second semiconductor electrode regions formed on inclined surfaces of the resistive tip and heavily doped with the second impurity; and a cantilever having an end portion on which the resistive tip is located, wherein a height of the resistive tip is less than a radius of the resistive tip.

The height of the resistive tip may be between ¼ and ¾ of the radius of the resistive tip. The height of the resistive tip may be approximately half of the radius of the resistive tip.

The first impurity may be a p-type impurity and the second impurity may be an n-type impurity.

The first impurity may be an n-type impurity and the second impurity may be a p-type impurity.

According to another aspect of the present invention, there is provided a method of fabricating a semiconductor probe having a resistive tip with a low aspect ratio, the method comprising: forming a mask layer on a top surface of a substrate that is doped with a first impurity; forming a stripe-shaped photoresist on the mask layer and wet-etching the mask layer using the photoresist as a mask; heavily doping regions of the substrate not covered by the wet-etched mask layer with a second impurity which is opposite in polarity to the first impurity to form first and second semiconductor electrode regions; annealing the substrate to reduce a distance between the first and second semiconductor electrode regions, and forming resistive regions lightly doped with the second impurity along outer boundaries of the first and second semiconductor electrode regions; patterning the mask layer to form a quadrangular mask layer; etching the quadrangular mask layer and the substrate not covered by the quadrangular mask layer to form a resistive tip on the substrate; and etching a bottom surface of the substrate to form a cantilever such that the resistive tip is located at an end portion of the cantilever.

The wet-etching of the mask layer may comprise forming opposite sides of the mask layer into a wave shape.

The annealing of the substrate may comprise forming a peak portion of the resistive tip by causing the resistive regions diffused from the first and second semiconductor electrode regions to contact each other.

The patterning of the mask layer may comprise: forming a stripe-shaped photoresist perpendicular to the wet-etched mask layer; and performing an etching process to form a quadrangular mask layer.

The etching of the mask layer and the substrate may comprise etching the mask layer at a greater etch rate than the substrate.

The etching of the quadrangular mask layer and the substrate may be performed so that an etch selectivity of the mask layer to the substrate is 4:3 to 4:1.

The etching of the quadrangular mask layer and the substrate may be performed so that an etch selectivity of the mask layer to the substrate is approximately 2:1.

The etching of the quadrangular mask layer and the substrate may comprise: annealing the substrate under an oxygen atmosphere to form an oxide layer with a predetermined thickness on a surface of the resistive tip; and removing the oxide layer to sharpen ends of the resistive regions.

The etching of the quadrangular mask layer and the substrate may further comprise etching the mask layer and the substrate such that the resistive regions diffused from the first and second semiconductor electrode regions contact each other on the substrate to form a peak portion of the resistive tip.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EXEMPLARY EMBODIMENTS

Figure 1:
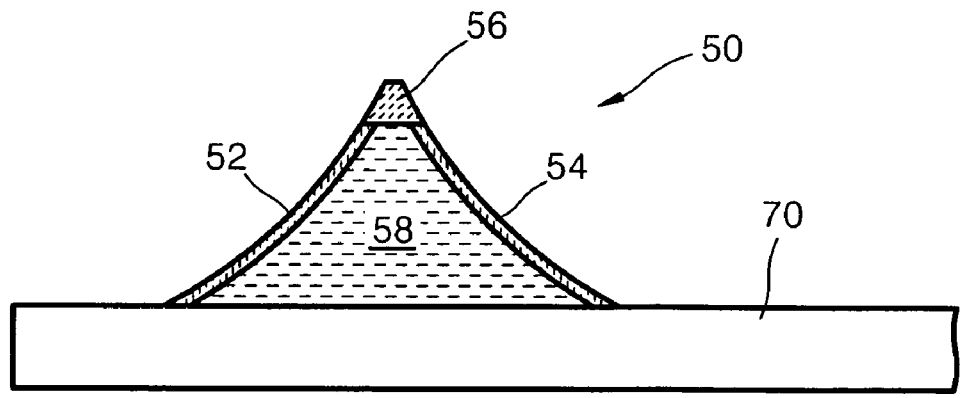
FIG. 1 is a cross-sectional view of a conventional semiconductor probe disclosed in International Patent Publication No. WO 03/096409.

The present invention will now be described more fully with reference to the accompanying drawings, in which exemplary embodiments of the invention are shown. The thicknesses of layers or regions illustrated in the drawings are exaggerated for clarity.

Figure 2:
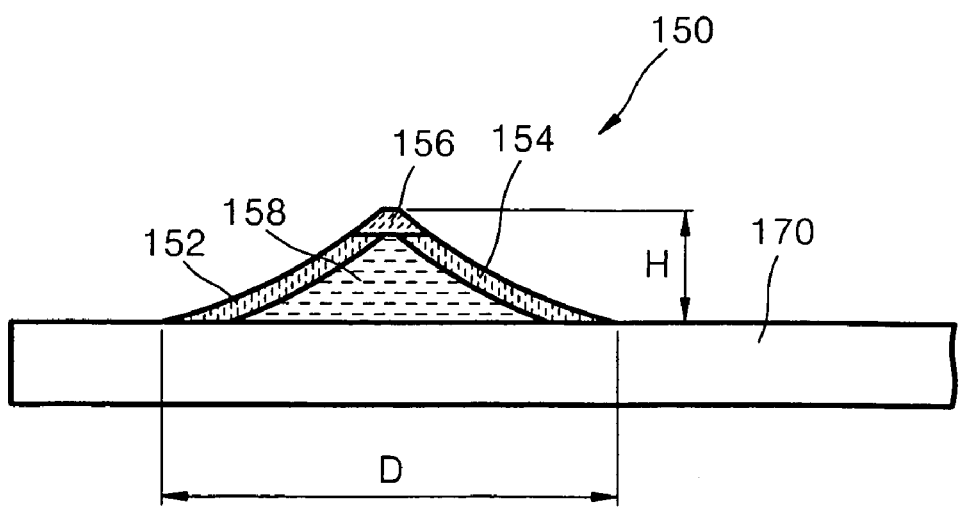
FIG. 2 is a cross-sectional view of a tip portion of a semiconductor probe having a resistive tip with a low aspect ratio according to an embodiment of the present invention.

FIG. 2 is a cross-sectional view of a tip portion of a semiconductor probe having a resistive tip 150 with a low aspect ratio according to an exemplary embodiment of the present invention.

Referring to FIG. 2, the resistive tip 150 of the semiconductor probe projects perpendicularly from an end portion of the cantilever 170. The resistive tip 150 includes a body 158 doped with a first impurity, a resistive region 156 formed at a peak of the resistive tip 150 and lightly doped with a second impurity which is opposite in polarity to the first impurity, and first and second semiconductor electrode regions 152 and 154 formed on inclined surfaces of the resistive tip 150 with the resistive region 156 therebetween. The first and second semiconductor electrode regions 152 and 154 are heavily doped with the second impurity. The first impurity may be a p-type impurity and the second impurity may be an n-type impurity.

The first and second semiconductor electrode regions 152 and 154 heavily doped with the second impurity are thickly formed on the inclined surfaces of the resistive tip 150. That is, since the first and second semiconductor electrode regions 152 and 154 acting as conductors, and the resistive region 156 are definitely separated from each other, precise probing can be done using the resistive region 156. The conductive first and second semiconductor electrode regions 152 and 154 block an electric field produced by a surface charge 157 of a recording medium 153 (see FIG. 3). Thus, the electric field does not affect the first and second semiconductor electrode regions 152 and 156 other than the resistive region 156. Accordingly, the electric field produced by the surface charge 157 of the recording medium 153 varies the resistance of the resistive region 156. The polarity and density of the surface charge 157 can be accurately detected using the variation in the resistance.

The height H of the resistive tip 150 with the low aspect ratio is less than the radius, which is half of the diameter D, of the resistive tip 150. The height H may range from ¼ to ¾ of the radius of the resistive tip 150, and preferably, but not necessarily, may be half of the radius.

Figure 3:
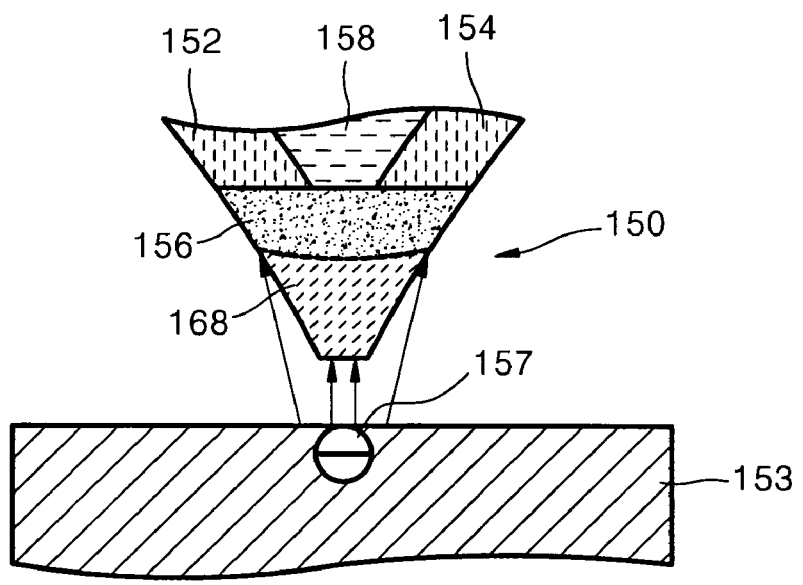
FIG. 3 is an enlarged view of a peak of the resistive tip of the semiconductor probe of FIG. 2.

FIG. 3 is an enlarged view of the peak of the resistive tip 150 of the semiconductor probe of FIG. 2.

The operation of the semiconductor probe having the resistive tip with the low aspect ratio will now be explained with reference to FIG. 3.

Even if a depletion region 168 does not extend to the first and second semiconductor electrode regions 152 and 154, the area of the resistive region 156 is reduced due to the depletion region 168, which is a non-conductor, thereby varying the resistance of the resistive region 156. Accordingly, the polarity and density of the surface charge 157 of the recording medium 153 can be detected using the variation in the resistance. It can be seen in FIG. 3 that the depletion region 168 formed in the resistive region 156 expands toward the first and second semiconductor electrode regions 152 and 153 due to the electric field produced by the surface charge 157. In particular, since the first and second semiconductor electrode regions 152 and 154 are heavily doped unlike the resistive region 156, the spatial resolution of the resistive region 156 is improved.

FIGS. 4A through 4J are perspective views illustrating a method of fabricating the semiconductor probe having the resistive tip with the low aspect ratio of FIG. 2.

Figure 4A:
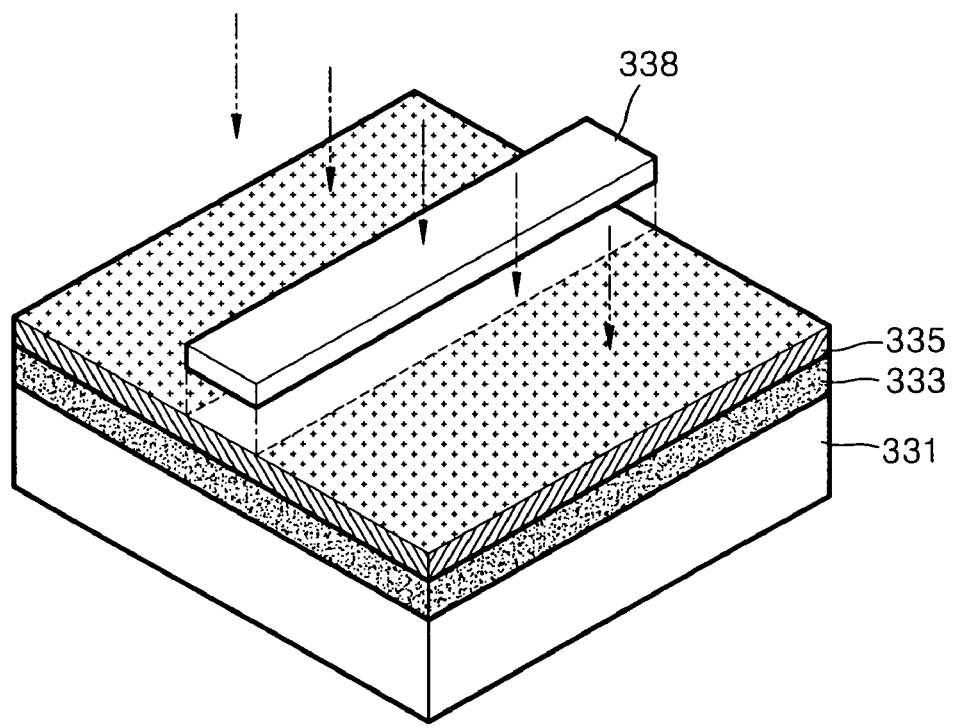
FIGS. 4A through 4J are perspective views illustrating a method of fabricating the semiconductor probe having the resistive tip with the low aspect ratio of FIG. 2 according to an embodiment of the present invention.

Referring to FIG. 4A, a mask layer 333, such as a silicon oxide layer or a silicon nitride layer, is formed on a surface of a silicon substrate 331 or a silicon-on-insulator substrate that is doped with a first impurity. A photoresist 335 is coated on a top surface of the mask layer 333. A stripe-shaped mask 338 is disposed above the photoresist 335.

Figure 4B:
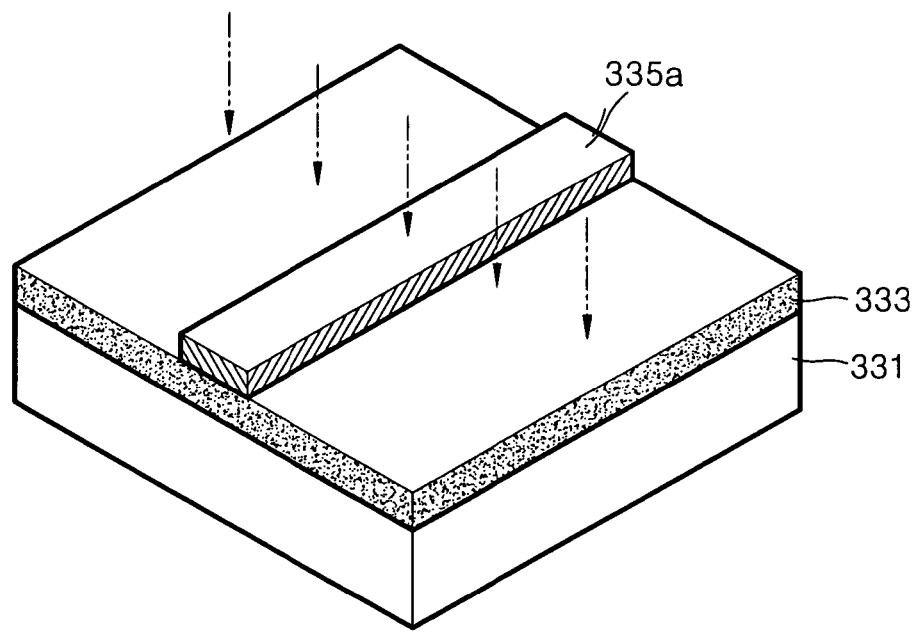

Referring to FIG. 4B, the resultant structure is exposed and developed to form a photoresist 335a having a predetermined shape.

Figure 4C:
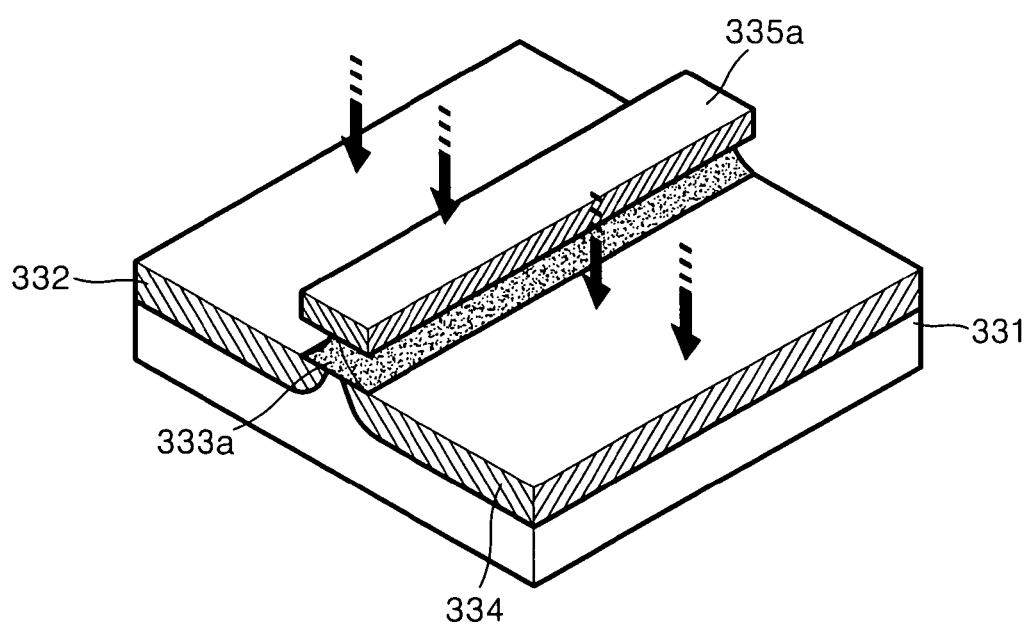

Referring to FIG. 4C, the mask layer 333 is wet-etched, such that the mask layer 333 is undercut under the photoresist 335a. As a result, a mask layer 333a having a wave-shaped section is formed on the silicon substrate 331. Next, regions of the substrate 331 not covered by the mask layer 333a are heavily doped with a second impurity to form first and second semiconductor electrode regions 332 and 334. Since the specific resistivity of the first and second semiconductor electrode regions 332 and 334 is sufficiently low, the first and second semiconductor electrode regions 332 and 334 function as conductors. Doping may be performed before the photoresist 335a on the mask layer 333a is removed. After the doping, the photoresist 335a is removed.

Figure 4D:
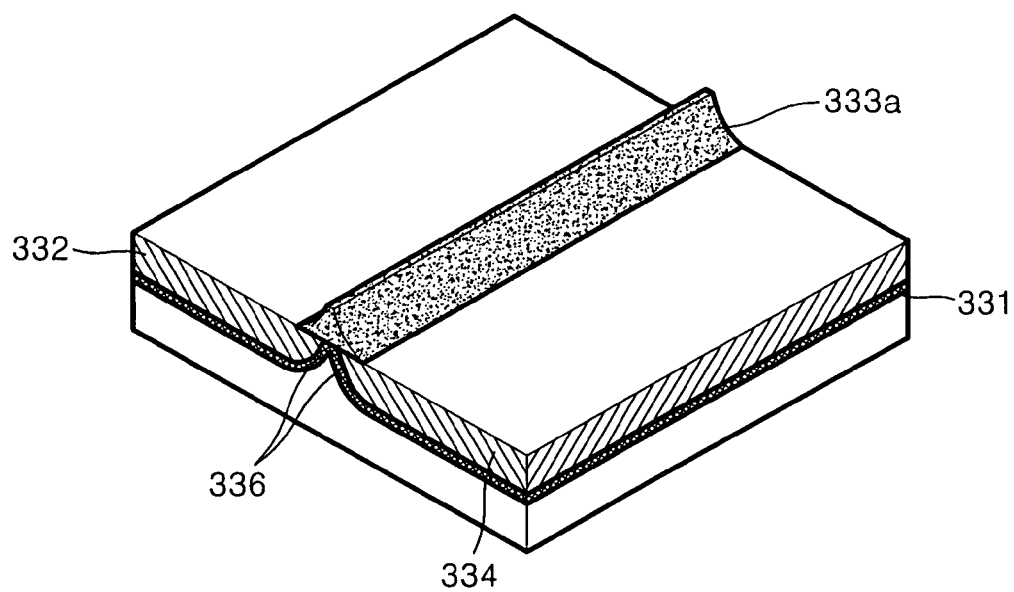

Referring to FIG. 4D, an annealing process is performed to decrease the width between the first and second semiconductor electrode regions 332 and 334 to less than the width of the mask layer 333a. As the first and second semiconductor electrode regions 332 and 334 heavily doped with the second impurity expand, the second impurity is diffused to regions contiguous with the heavily doped regions to form resistive regions 336 lightly doped with the second impurity. The resistive regions 336 under the mask layer 333a contact each other to form a peak portion which will be explained in detail later. This contact between the resistive regions 336 may be formed in a subsequent thermal oxidation process.

Figure 4E:
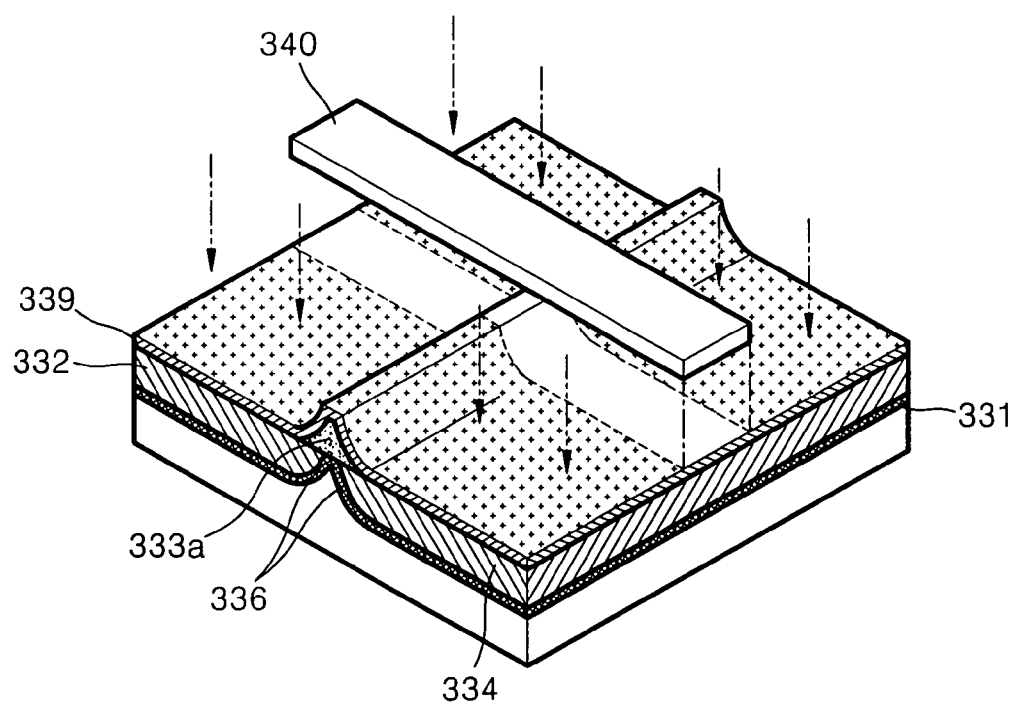
Figure 4F:
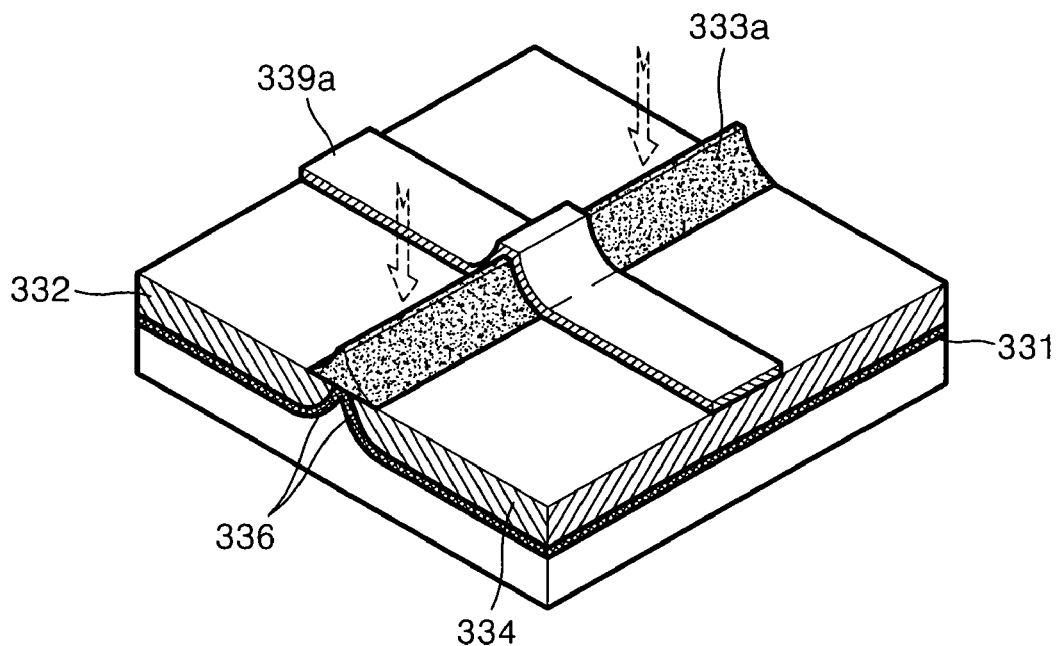

Referring to FIG. 4E, a photoresist 339 is coated on the top surface of the substrate 331 to cover the mask layer 333a. A stripe-shaped photomask 340 is disposed above the photoresist 339, perpendicular to the mask layer 333a. Referring to FIG. 4F, the resultant structure is exposed, developed, and etched to form a photoresist layer 339a with the same shape as the photomask 340.

Figure 4G:
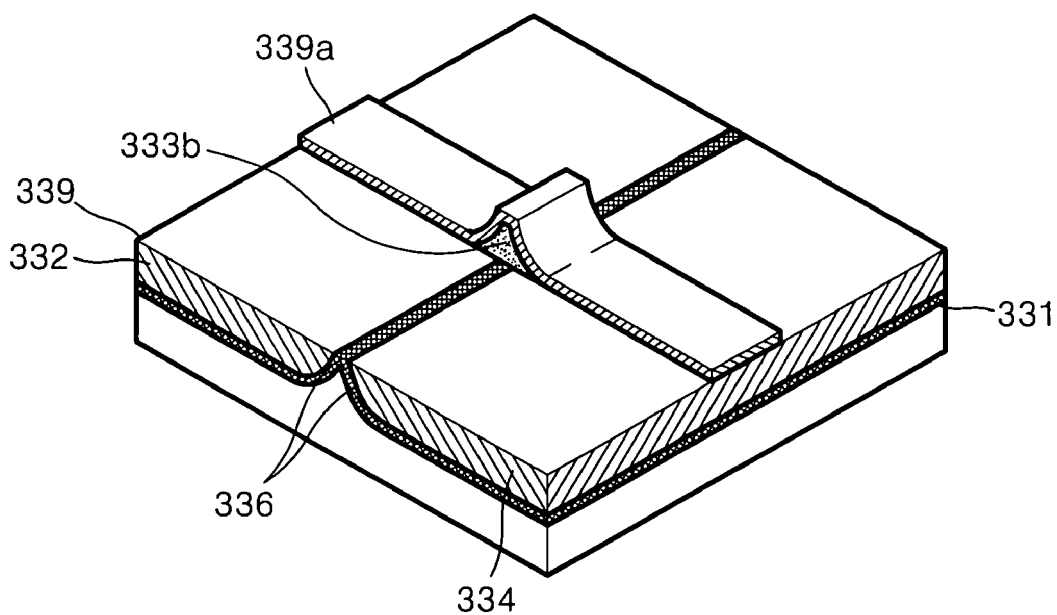

Referring to FIG. 4G, the mask layer 333a exposed by the stripe-shaped photoresist 339a is dry-etched to form a quadrangular mask layer 333b.

Figure 4H:
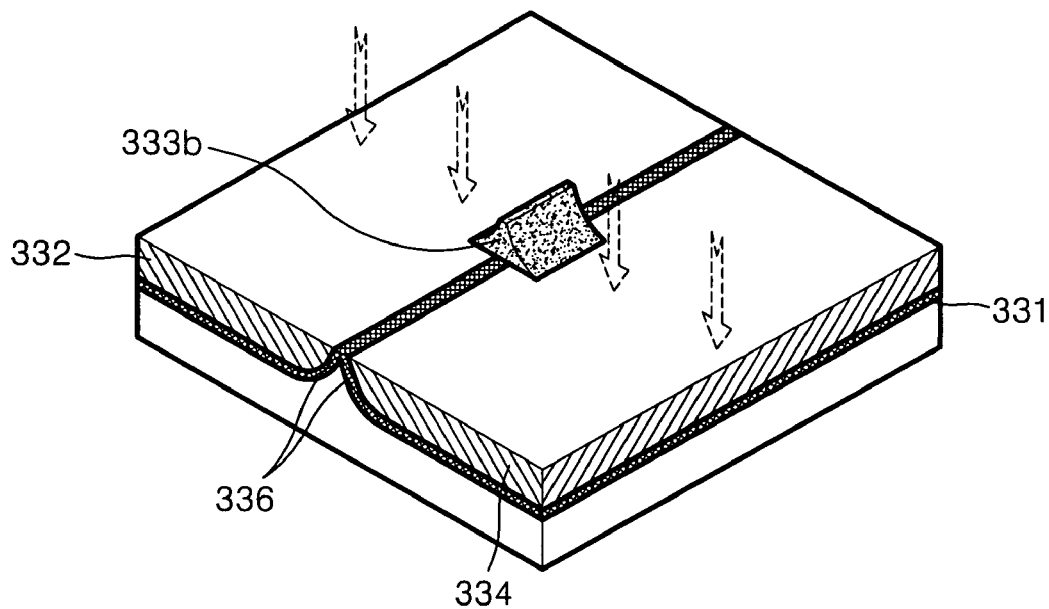
Figure 4I:
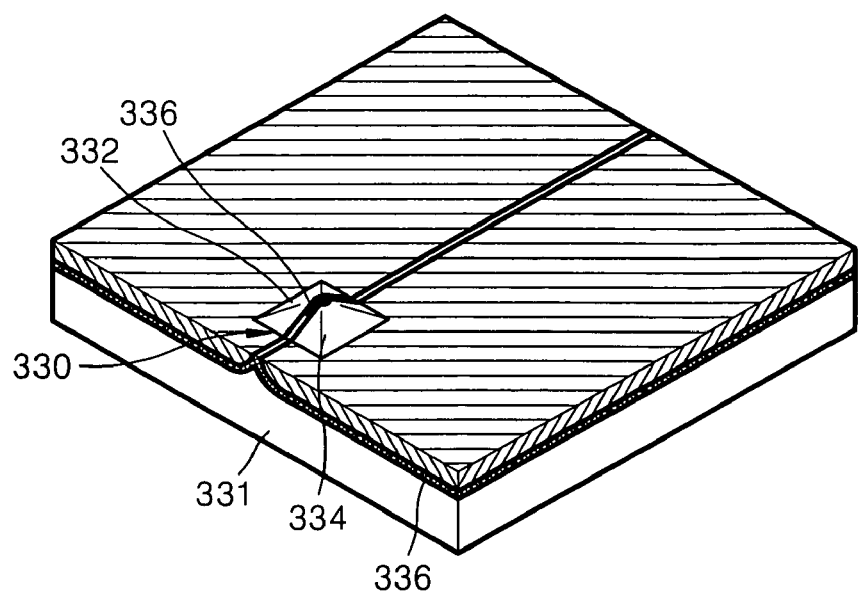

Referring to FIG. 4H, the photoresist 339a is removed, and the substrate 331 is dry-etched using the mask layer 333b as a mask to form a resistive tip 330 as shown in FIG. 4I. The mask layer 333b and the silicon substrate 331 are etched at different etch rates such that the shape of the mask layer 332b is transferred to the silicon substrate 331. An etch selectivity of the mask layer 333b made of $SiO_2$ to the silicon substrate made of Si may be 1:¼ to 1:¾. In an exemplary embodiment of the present invention, the etch selectivity may be 1:½. Referring to FIG. 2, the etch selectivity is 1:½ and thus the height of the resistive tip is half of the radius of the resistive tip.

Referring to FIG. 4I, the first and second semiconductor electrode regions 332 and 334 are disposed on inclined surfaces of the resistive tip 330, and the resistive regions 336 are aligned at a peak of the resistive tip 330.

Next, the substrate 331 is heated under an oxygen atmosphere to form a silicon oxide layer (not shown) with a predetermined thickness on the top surface of the substrate 331. The silicon oxide layer is removed to sharpen ends of the resistive regions 336. Through the thermal oxidation process, the resistive tip 330 can be sharpened and the resistive regions 336 can contact each other.

Figure 4J:
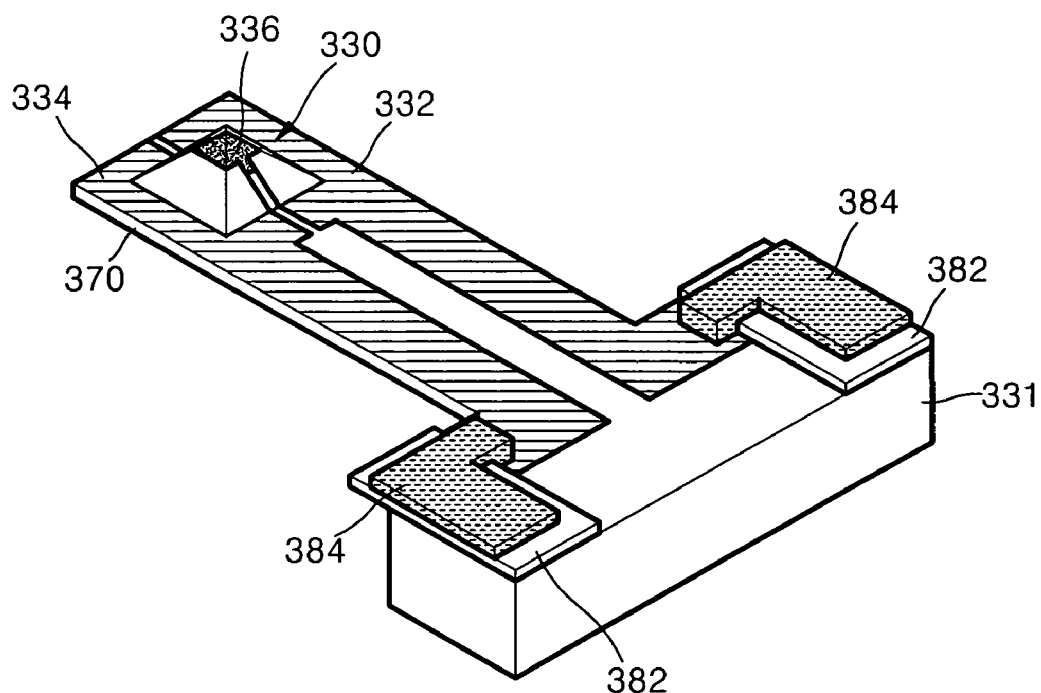

Referring to FIG. 4J, a bottom surface of the substrate 331 is etched to form a cantilever 370 so that the resistive tip 330 can be located at an end portion of the cantilever 370. Electrode pads 384 insulated by insulating layers 382 are connected to the first and second semiconductor electrode regions 332 and 334 on the substrate 331 to complete the semiconductor probe.

Figure 5:
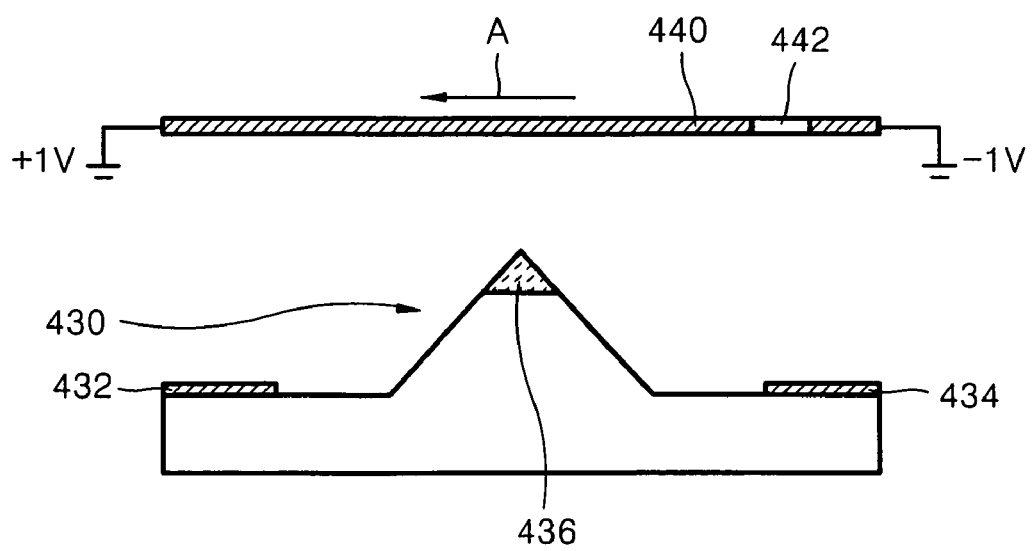
FIG. 5 is a cross-sectional view of a probe used in a simulation to compare resolutions between the semiconductor probe having the resistive tip with the low aspect ratio of FIG. 2 and a conventional semiconductor probe.
Figure 6:
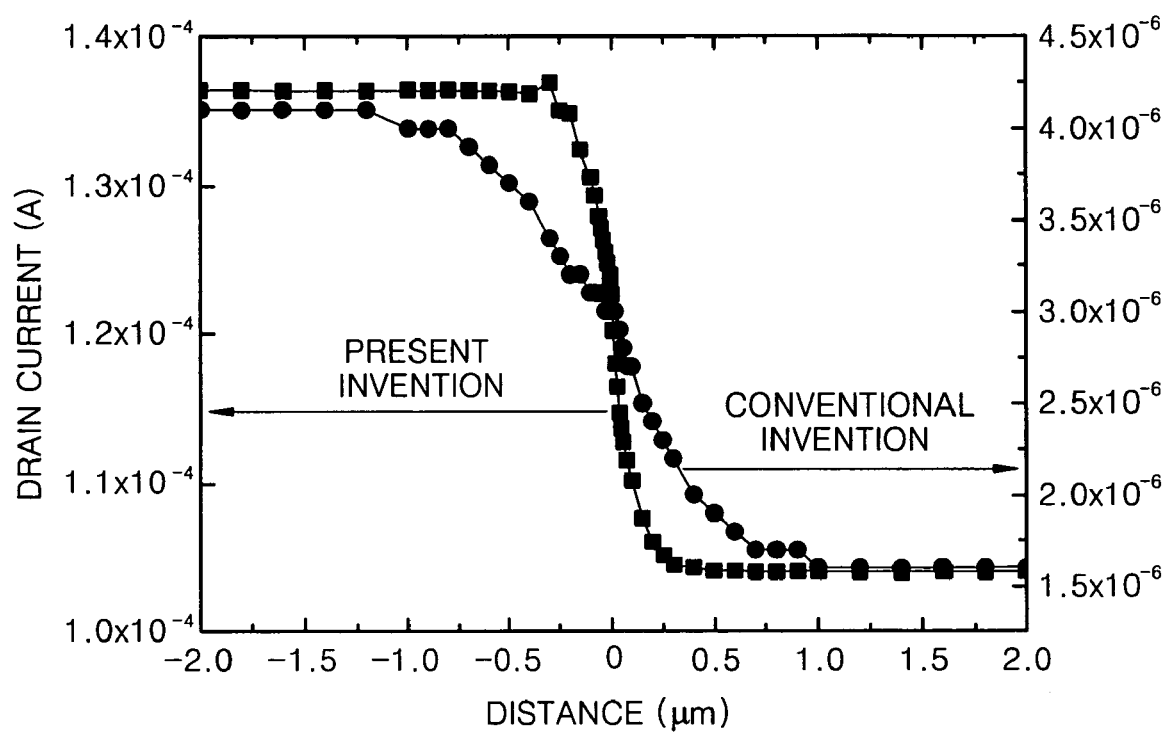
FIG. 6 is a graph illustrating a drain current of the probe of FIG. 5 according to a charge variation.

FIG. 5 is a cross-sectional view of a probe used in a simulation to compare the resolutions of the semiconductor probe having the resistive tip with the low aspect ratio of FIG. 2 and a conventional semiconductor probe. FIG. 6 is a graph illustrating a drain current of the probe of FIG. 5 according to a charge variation.

Referring to FIG. 5, source and drain electrodes 432 and 434 were formed on either side of a resistive tip 430. A resistive region 436 was formed at a peak of the resistive tip 430. A metal 440 to which a floating voltage was applied was separated from the resistive region 436. The diameter of an opening 442 of the metal 440 was 10 nm, and a gap between the metal 440 and the resistive region 436 was 10 nm. +1 V and −1 V were applied to opposite ends of the metal 440, and the drain current of the resistive tip 430 was calculated while moving the floating voltage in a direction marked by an arrow A. Referring to FIG. 6, a transition width between the opposite charges (plus and minus) in the resistive tip 430 of the exemplary embodiment of the present invention was sharper than in the conventional tip, and the drain current obtained while detecting the charge of the metal 440 was very high. This is because the source and drain electrodes 432 and 434 formed on either side of the resistive region 436 of the resistive tip 430 were heavily doped to improve the resolution of the resistive region 436.

In the semiconductor probe having the resistive tip with the low aspect ratio according to an exemplary embodiment of the present invention, both the sides of the resistive region that is formed at the peak of the resistive tip act as conductive regions, thereby improving the resolution of the resistive region.

According to the method of fabricating the semiconductor probe having the resistive tip with the low aspect ratio according to an exemplary embodiment of the present invention, the mask is dry-etched at a greater etch rate than the silicon substrate such that the first and second semiconductor electrode regions on either side of the resistive region are etched slightly. Hence, the heavily doped electrode regions are thick, making it possible to fabricate a high-resolution semiconductor probe.

When the manufactured semiconductor probe is applied to ultra-small large-capacity information storage devices, a device for recording and reproducing information by detecting or forming a charge in a small area can be realized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor probe comprising:
   a resistive tip which is doped with a first impurity and comprises:
      a resistive region formed at a peak of the resistive tip and doped with a second impurity opposite in polarity to the first impurity; and
      first and second semiconductor electrode regions formed on inclined surfaces of the resistive tip and doped with the second impurity; and
   a cantilever having an end portion on which the resistive tip is located,
   wherein a height of the resistive tip is less than a radius of the resistive tip, and
   wherein the resistive region is doped lighter than the first and second semiconductor electrode regions.

2. The semiconductor probe of claim 1, wherein a height of the resistive tip is between ¼ and ¾ of a radius of the resistive tip.

3. The semiconductor probe of claim 2, wherein the height of the resistive tip is approximately half of the radius of the resistive tip.

4. The semiconductor probe of claim 1, wherein the first impurity is a p-type impurity and the second impurity is an n-type impurity.

5. The semiconductor probe of claim 1, wherein the first impurity is an n-type impurity and the second impurity is a p-type impurity.

6. A method of fabricating a semiconductor probe having a resistive tip with a low aspect ratio, the method comprising:
   forming a mask layer on a top surface of a substrate which is doped with a first impurity;

forming a stripe-shaped photoresist on the mask layer and wet-etching the mask layer using the photoresist as a mask;

doping a region of the substrate not covered by the wet-etched mask layer with a second impurity which is opposite in polarity to the first impurity to form first and second semiconductor electrode regions;

annealing the substrate to reduce a distance between the first and second semiconductor electrode regions, and forming a resistive region doped with the second impurity along outer boundaries of the first and second semiconductor electrode regions, wherein the resistive region is doped lighter than the region of the substrate not covered by the wet-etched mask layer;

patterning the mask layer to form a quadrangular mask layer;

etching the quadrangular mask layer and the substrate not covered by the quadrangular mask layer to form a resistive tip on the substrate; and etching a bottom surface of the substrate to form a cantilever such that the resistive tip is located at an end portion of the cantilever.

7. The method of claim 6, wherein the wet-etching of the mask layer comprises forming opposite sides of the mask layer into a wave shape.

8. The method of claim 7, wherein the annealing of the substrate comprises forming a peak portion of the resistive tip by causing the resistive regions diffused from the first and second semiconductor electrode regions to contact each other.

9. The method of claim 7, wherein the patterning of the mask layer comprises:

forming another stripe-shaped photoresist perpendicular to the wet-etched mask layer; and performing an etching process to form a quadrangular mask layer.

10. The method of claim 7, wherein the etching of the quadrangular mask layer and the substrate comprises etching the mask layer at a greater etch rate than the substrate.

11. The method of claim 10, wherein the etching of the quadrangular mask layer and the substrate is performed so that an etch selectivity of the mask layer to the substrate is 4:3 to 4:1.

12. The method of claim 11, wherein the etching of the quadrangular mask layer and the substrate is performed so that an etch selectivity of the mask layer to the substrate is approximately 2:1.

13. The method of claim 7, wherein the etching of the quadrangular mask layer and the substrate further comprises:

annealing the substrate under an oxygen atmosphere to form an oxide layer with a predetermined thickness on a surface of the resistive tip; and removing the oxide layer to sharpen ends of the resistive regions.

14. The method of claim 13, wherein the annealing of the substrate under an oxygen atmosphere further comprises forming a peak portion of the resistive tip by causing the resistive regions diffused from the first and second semiconductor electrode regions to contact each other.

15. The method of claim 7, wherein the first impurity is a p-type impurity and the second impurity is an n-type impurity.

16. The method of claim 7, wherein the first impurity is an n-type impurity and the second impurity is a p-type impurity.

17. The method of claim 6, wherein the distance between the first and second semiconductor electrode regions is smaller than the width of the wet-etched mask layer.

18. The method of claim 6, wherein the etching of the quadrangular mask layer and the substrate not covered by the quadrangular mask layer is performed by dry-etching.

* * * * *